United States Patent [19]

Feigenbaum

[11] Patent Number: 4,463,067

[45] Date of Patent: Jul. 31, 1984

[54] FUEL CELL AND SYSTEM FOR SUPPLYING ELECTROLYTE THERETO UTILIZING CASCADE FEED

[75] Inventor: Haim Feigenbaum, Highland Park, N.J.

[73] Assignee: Engelhard Corporation, Iselin, N.J.

[21] Appl. No.: 430,145

[22] Filed: Sep. 30, 1982

[51] Int. Cl.³ .................................................. H01M 8/04
[52] U.S. Cl. ........................................ 429/34; 429/38; 429/72
[58] Field of Search ..................... 429/34, 38, 39, 41, 429/13, 51, 80, 72, 44

[56] References Cited

U.S. PATENT DOCUMENTS 4,366,211 12/1982 Pollack .................................. 429/38

Primary Examiner—Anthony Skapars

[57] ABSTRACT

An electrolyte distribution supply system for use with a fuel cell having a wicking medium for drawing electrolyte therein is formed by a set of containers of electrolyte joined to respective fuel cells or groups thereof in a stack of such cells. The electrolyte is separately stored so as to provide for electrical isolation between electrolytes of the individual cells or groups of cells of the stack. Individual storage compartments are coupled by individual tubes, the ends of the respective tubes terminating on the wicking medium in each of the respective fuel cells. The individual compartments are filled with electrolyte by allowing the compartments to overflow such as in a cascading fashion thereby maintaining the requisite depth of electrolyte in each of the storage compartments. The individual compartments can also contain packed carbon fibers to provide a three stage electrolyte distribution system.

14 Claims, 7 Drawing Figures

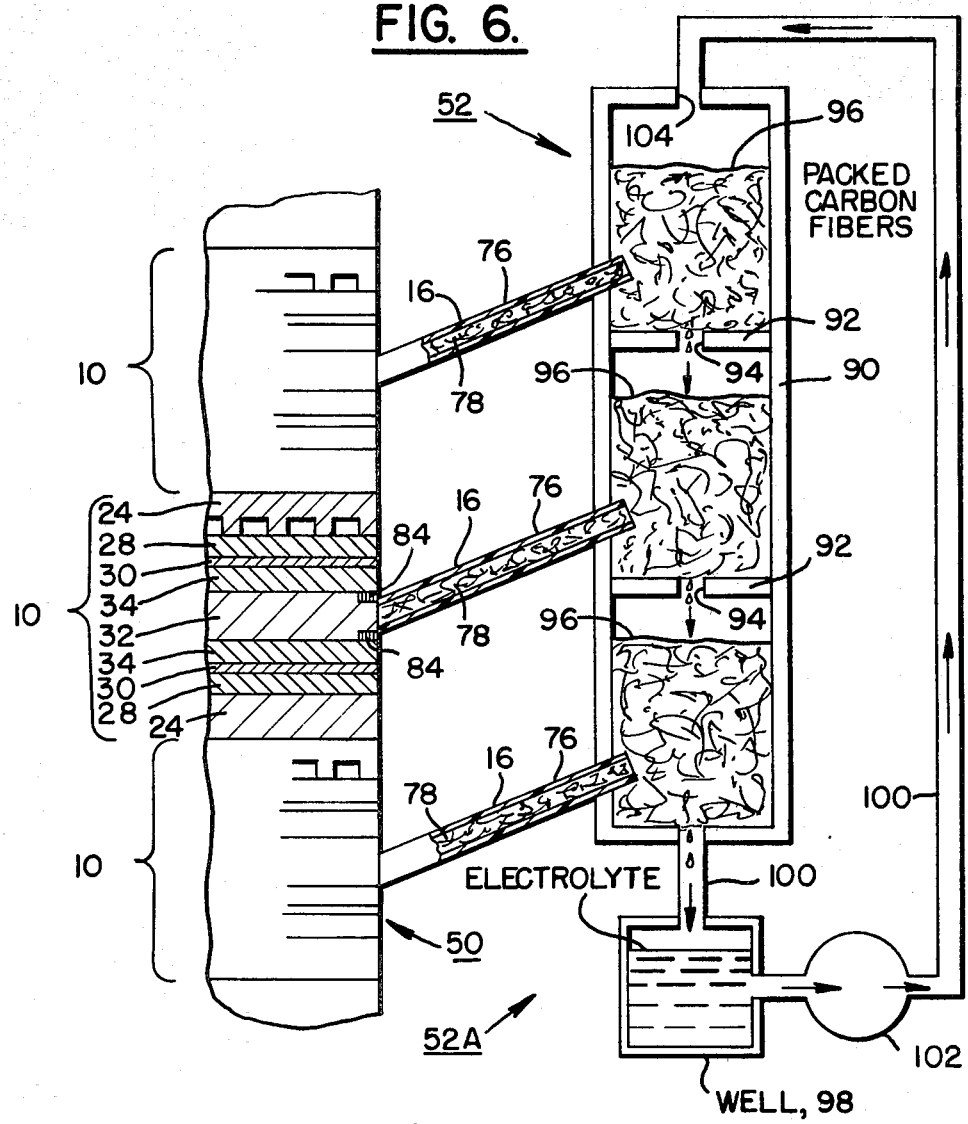
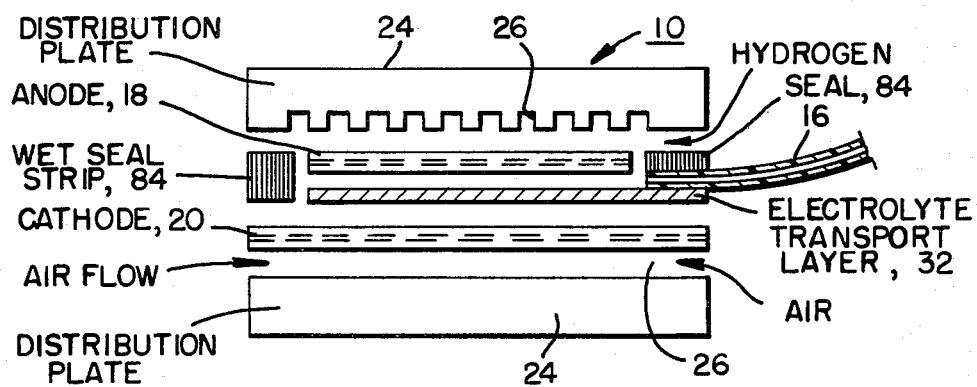

FUEL CELL AND SYSTEM FOR SUPPLYING ELECTROLYTE THERETO UTILIZING CASCADE FEED

The National Aeronautics and Space Administration has rights under this application pursuant to Contract No. DEN3-241.

BACKGROUND OF THE INVENTION

Reference is hereby made to other related patent applications which are assigned to the same assignee as the present application; application of O. Adlhart entitled "Fuel Cell With Multiple Porosity Electrolyte Matrix Assembly", Ser. No. 430,143, filed on Sept. 30, 1982; application of H. Feigenbaum entitled "Fuel Cell With Electrolyte Feed System", Ser. No. 430,156, filed on Sept. 30, 1982; application of O. Adlhart and H. Feigenbaum entitled "Fuel Cell and System For Supplying Electrolyte Thereto", Ser. No. 430,144, filed on Sept. 30, 1982; and application of J. Cohn, H. Feigenbaum and A. Kaufman entitled "Fuel Cell and System For Supplying Electrolyte Thereto With Wick Feed", Ser. No. 430,155, filed on Sept. 30, 1982.

This invention relates to a fuel cell having electrodes with an electrolyte supporting structure interposed therebetween for the drawing of electrolyte into interaction regions at the electrodes for electromechanical reactions with fluidic reactants and, more particularly, to an electrolyte supply system coupled to said electrolyte support structure for storing and conducting electrolyte to the cell with constant hydrostatic pressure.

Much research is being done in the area of fuel cell technology in order to provide ever increasing amounts of electric power and for operating such cells over longer periods of time without any need for shutdown to accomplish maintenance. As compared to other methods of generation of electric power from combustible fuels, a fuel cell has higher efficiency and is also characterized by a simplicity of physical structure in that such cells can be constructed without any moving parts.

While a variety of electrochemical reactions are known for the conversion of fuel into electricity without the direct burning of such fuels, one well-known form of cell utilizes the reaction between oxygen and hydrogen, the hydrogen serving as the fuel. One common form of construction for the hydrogen-oxygen cell is the laminated structure wherein the electrodes are spaced apart by a porous layer of material which holds an electrolyte. For example, the electrolyte may be a concentrated phosphoric acid. The hydrogen is guided by passageways behind the active region of the anode and the oxygen is guided by passageways behind the active region of the cathode. At the anode, the hydrogen gas dissociates into hydrogen ions plus electrons in the presence of a catalyst, typically a precious metal such as platinum or platinum with other metals. The hydrogen ions migrate through the electrolyte to the cathode in a process constituting ionic current transport while the electron travels through an external circuit to the cathode. In the presence of a catalyst at the cathode, the hydrogen ions, the electrons, and molecules of oxygen combine to produce water.

In order to provide for the physical placement of the respective reactants at catalyst layers of the anode and cathode, layers of materials having hydrophilic and hydrophobic properties are disposed in an arrangement contiguous to the catalyst layers. They permit the electrolyte and the oxygen at the cathode and the hydrogen at the anode to contact the catalyst layer. The hydrophobic material is provided with pores of sufficiently large size to permit the gaseous hydrogen and the gaseous oxygen to freely flow through the material so as to come into contact with the catalyst.

Details in the construction of fuel cells, and in the components parts thereof, are disclosed in the U.S. Pat. No. 3,453,149 of Adlhart and U.S. Pat. No. 4,064,322 of Bushnell. These two patents show structures for guiding the gaseous reactants into the regions of the catalyst. In addition, the Bushnell patent shows space within a cell for the storage of electrolyte so as to compensate for any changes in the quantity of electrolyte available for ion transport. An assembly for combining together a plurality of fuel cells in a single power source is disclosed in U.S. Pat. No. 4,175,165 of Adlhart. This patent also shows a manifold for the simultaneous feeding of the reactant gases to the cathode and the anode of the respective cells. The foregoing three patents are incorporated herein in their entirety by reference.

A problem arises during the operation of a fuel cell in that the cell has electrolyte losses. For instance, as a result of electrolyte volume changes, such as those due to temperature and composition changes, electrolyte can be driven out of the matrix and be permanently lost from use within the matrix. A fuel cell has limited capacity for the storage of additional electrolyte therein. Thus, depending on the amount of such storage capacity, there is a limitation on the length of time during which the fuel cell can be operated before shutdown for maintenance. Such maintenance includes the replenishment of the amount of electrolyte in the requisite concentration.

A further problem arises in the complexity of the structure required to lead the electrolyte in from a region of storage into the region of electrochemical activity alongside the layers of the catalyst. Such electrolyte lead-in structures are described in the foregoing Bushnell patent. In particular, it is noted that such structures tend to increase the size of the cell, to increase resistance losses associated with the flow of electric current, and to decrease the surface area available for the electrochemical reactions.

Yet another problem is the supplying of electrolyte to such a fuel cell in a manner in which it can be absorbed by the cell at such rate as may be necessitated by the loss of electrolyte during the operation of the cell.

SUMMARY OF THE INVENTION

The foregoing problems are overcome and other advantages are provided by a fuel cell and a system for supplying electrolyte thereto, both the cell and the supply system being fabricated in accordance with the invention. The cell is constructed with an electrolyte supporting structure having a means to draw and distribute electrolyte therein, and the supply system is constructed so as to make electrolyte available to the cell at such rates as may be required. The fuel cell comprises a laminated structure wherein the electrodes are spaced apart by a layer of porous material. One embodiment of the invention, the porous material is provided as a matrix assembly having a central layer of relatively large pores.

In accordance with the invention, the supply system is provided with a gravity feed wherein cups or trays are provided at different elevations corresponding to the elevations of respective ones of the cells in a stack of such cells in a fuel cell power supply. A pump is provided for pumping electrolyte above the trays allowing the electrolyte to cascade from tray to tray whereby the trays are filled to their rims. A set of conduits carries electrolyte from respective ones of the trays to electrolyte supporting members in respective ones of the fuel cells. The rate of flow of electrolyte into the cell is controlled by the electrolyte demand of the electrolyte supporting structure in each cell and the hydrostatic pressure developed by the difference in height between a tray and its corresponding cell.

BRIEF DESCRIPTION OF THE DRAWINGS

The foregoing aspects and other features of the invention are explained in the following description taken in connection with the accompanying drawings wherein:

FIG. 6 is a diagrammatic sectional view of an alternative embodiment of the supply system of FIG. 2 constructed of sponge material in trays having drains for excess electrolyte; and FIG. 7 is a diagrammatic view of a fuel cell, such as the cell of FIG. 1, showing the interconnection of an electrolyte wicking fiber to an electrolyte supplying member of the cell.

DETAILED DESCRIPTION OF THE INVENTION

Figure 1:
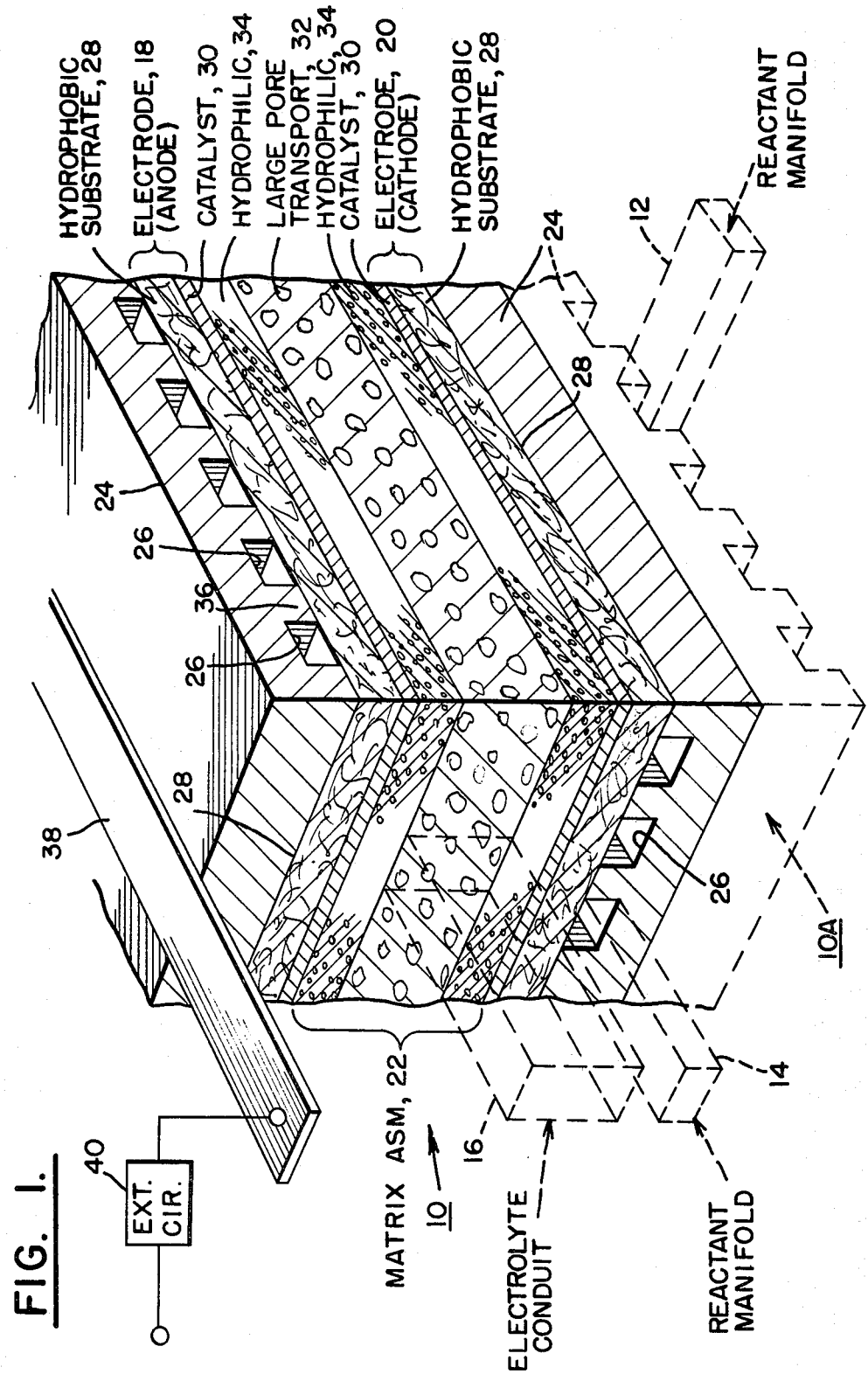
FIG. 1 is a perspective view of a portion of a stack of fuel cells in an assembly of such fuel cells, the portion comprising one complete fuel cell with a second cell being partially shown in phantom and the fuel cell being sectioned to identify the individual layers thereof.
Figure 2:
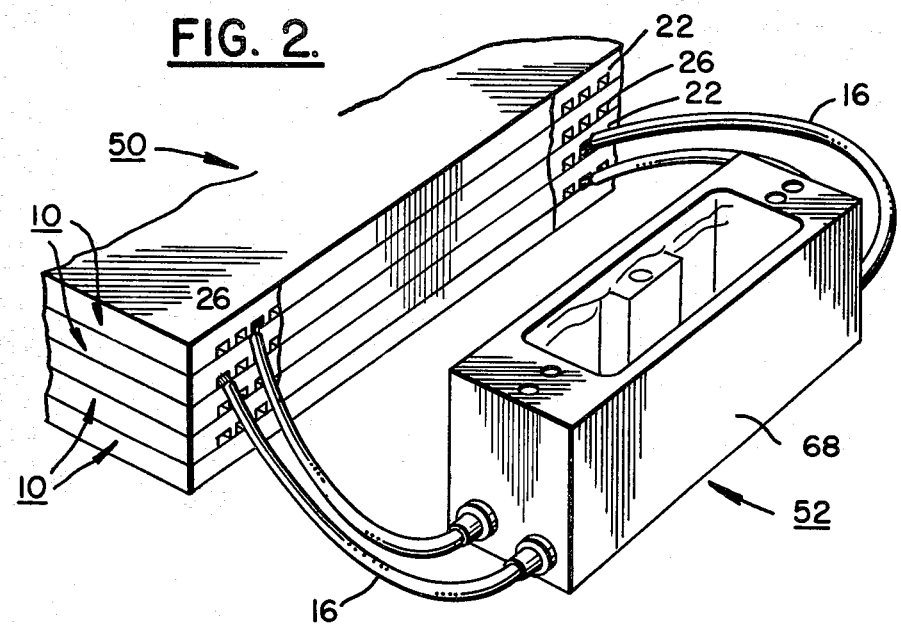
FIG. 2 is a stylized perspective view of a system for supplying electrolyte to a stack of fuel cells each cell being of the form shown in FIG. 1.
Figure 3:
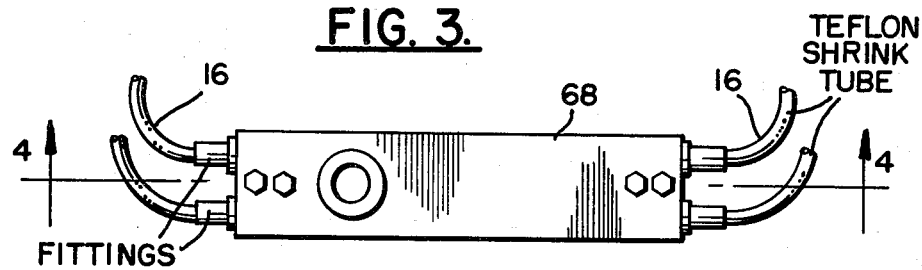
FIG. 3 shows a top view of a manifold which can be used in the system of FIG. 2 for delivery of electrolyte to the fuel cell of FIG. 1.
Figure 4:
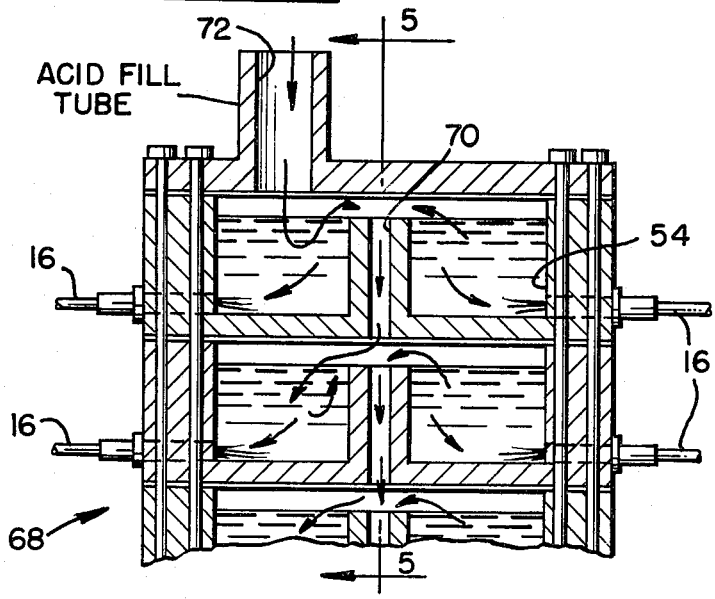
FIG. 4 is a sectional view of a portion of the manifold taken along the line 4—4 in FIG. 3 showing the arrangement of trays holding the electrolyte.
Figure 5:
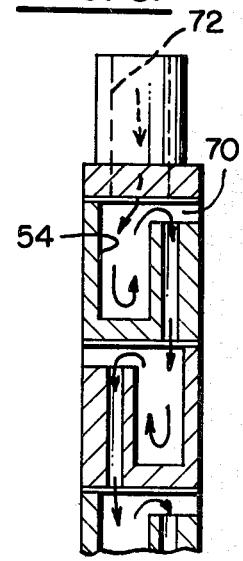
FIG. 5 is a sectional view of a portion of a manifold taken along the line 5—5 in FIG. 4.

In FIG. 1, a fuel cell 10 is shown in perspective view. A part of a second fuel cell 10A, having the same construction as the cell 10, is shown in phantom and is placed contiguous to the cell 10 as would be the case if the cell 10 is understood to be one of many such cells which would ordinarily be placed in a stack (not shown). Connections of the cells 10 and 10A via manifolds for the conveyance of reactants and via conduits for the conveyance of electrolyte are shown schematically. Two such representative manifolds are shown; a manifold 12 for the conveyance of hydrogen to the anode of respective cells of the stack and a manifold 14 for the conveyance of oxygen to the cathode of respective cells of the stack. A set of electrolyte conduits 16 (only one of which is shown) conveys electrolyte to the respective cells of the stack. Although manifolds 12 and 14 are shown in a representative fashion in FIG. 1, it is understood that a single manifold for each reactant running generally along the side of the stack can feed reactants to the cells through respective passages 26.

The fuel cell 10 comprises two electrodes, namely, an anode 18 and a cathode 20 which are separated by a means to draw and distribute electrolyte such as an electrolyte matrix assembly 22. Each electrode abuts a reactant distribution plate 24. The top of the cell in FIG. 1, having grooves to bring in and distribute only one reactant since it is at the end of the stack, has a termination plate 24. The plates 24 on the other side of the cell depicted are part of a bi-polar assembly made up of two gas distribution plates 24 in back-to-back position to supply reactants to the cell shown and the adjacent cell not shown. Plates 24, the termination plate and the bi-polar assembly, have passages 26 for the entry of the fluidic or gaseous reactants and elimination of any residual gases. Each electrode comprises a hydrophobic substrate layer 28 and a catalyst 30. The plates 24 of the cell 10A provide a series interconnection of the two cells. The means to draw and distribute electrolyte in the cell can be of any suitable type. For instance, it can be a material having pores therein of a particular size to draw and distribute the electrolyte. Alternatively, it can be a material made from two or more layers of different size pores, such as that shown in FIG. 1.

The matrix assembly 22 comprises a central permeable layer 32 of fibrous carbon sheet material having relatively large pores, the central layer 32 being positioned between two outside permeable layers 34 with pores which are smaller than the pores of the central layer 34. The electrolyte, typically phosphoric acid, is contained in the central layer 32. The pores of the central layer 32 are sufficiently large to permit the electrolyte to freely migrate through the central layer 32 so as to replenish the electrolyte within the cell 10 as may be required. The central layer 32 need not necessarily be completely filled with the electrolyte, it being necessary only to provide sufficient electrolyte to insure ionic conductivity between the electrodes 18 and 20.

The smaller pores of the outside layers 34 exert a strong capillary force which draws in the electrolyte from the central layer 32 to completely fill each of the outside layers 34. Layers 34 have a fast rate of uptake of electrolyte contained in the large pore layer 32 as needed. By providing adequate electrolyte to layers 34, each outside layer 34 serves as a barrier against the flow of reactant gas into the matrix assembly area. Thus, electrolyte is found in each of the three layers of the membrane 22 to provide ionic conductivity to the matrix assembly 22, the matrix assembly 22 with the electrolyte therein serving as a path by which positive hydrogen ions can migrate via ionic current transport from the anode 18 to the cathode 20.

The outer layers 34 of the matrix assembly 22 have silicon carbide powder bonded with PTFE particles for increased hydrophilic properties to further insure that the layers 34 serve as gas barriers. In constrast, the hydrophobic layers 28 are impregnated with PTFE on the base material of the fibrous carbon to produce the hydrophobic characteristics. The porosity of the hydrophobic layer 28 is characterized by large pores through which the gaseous reactants can freely circulate so as to propagate from the passages 26 to the catalyst 30. Thus, the catalyst 30 is surrounded by hydrophobic and hydrophilic layers, the hydrophobic layer facing the gaseous reactants and the hydrophilic layer facing the electrolyte.

The hydrophobic layer 28 in each electrode is impregnated with Teflon to prevent the electrolyte from flooding into the electrode. This is an advantageous feature in the construction of the cell 10 since such flooding, if permitted, would reduce the number of open pores through which the gaseous reactants must pass in the electrodes, a reduced number of available pores would result in a diminution in the capacity of the cell to produce electricity.

The hydrophobic layer 28 brings the gaseous reactant into contact with the catalyst 30 while the hydrophilic layer 34 brings the electrolyte into contact with the catalyst 30. Thereby, respective electrochemical reactions can take place at the catalyst 30 of the anode 18 and at the catalyst 30 of the electrode 20. The catalyst 30 is conveniently formed of a precious metal such as platinum with or without other metals which, for the purpose of bonding and wet-proofing, is deposited on the hydrophobic layer 34. The same construction is utilized in each of the electrode 18 and 20. It is noted that both the hydrophobic layer 28, the plate 24 and the electrodes 18 and 20 are electrically conducting. Thus, in the case of the anode 18, electrons released by the electrochemical reactions can propagate from the catalyst 30 through the fibrous carbon of the hydrophobic layer 28 and into the partitions or ribs 36 of the plate 24 which separate the respective passages 26.

In the series arrangement depicted in FIG. 1, the electrons from the anode of one cell are conducted directly to the cathode of the adjoining cell so as to migrate through the entire stack. An exemplary stack termination contact 38 is shown attached by conventional methods to the plate 24 of the anode 18. The contact 38 is coupled to an external circuit 40 (indicated in block diagrammatic form) while the other terminal of the external circuit 40 is coupled to a similar contact (not shown) at the opposite end of the stack of the fuel cells. The electrons can, thereby, make a complete crcuit from the negative terminal of the stack (the last of the anodes) via the external circuit 40 to the positive terminal of the stack (the first of the cathodes). Correspondingly, the hydrogen ions can migrate in each cell through the electrolyte contained in the matrix assembly proceeding from the anode of the cell through the cell to the cathode of the cell.

In operation, hydrogen is admitted through the manifold 12 to the passages 26 in the anodes 18 of each of the cells in the stack. Oxygen is admitted through the manifold 14 into the passages 26 of the cathodes 20 in each of the cells of the stack. Electrolyte is applied via the set of conduits 16 to make contact with the central layers 34 of the membranes 22 in the respective fuel cells of the stack. By capillary action, the electrolyte is brought into contact with the catalyst 30 in each of the electrodes 18 or 20. The hydrogen propagates from the passages 26 through the pores of the hydrophobic layer 28 to the catalyst 30 in the cathode 20. Thereby, the hydrogen and the electrolyte are placed in contact with each other at the interface of the catalyst 30 at the anode 18 and the oxygen and the electrolyte are placed in contact with each other at the interface of the catalyst 30 of the cathode 20 to provide for the respective electrochemical reactions at the anode 18 and cathode 20. It is in these locations of the cell that the respective electrochemical reactions to produce electricity occur.

In accordance with a feature of the invention, the matrix assembly 22 is continuously in contact with electrolyte brought in by the set of conduits 16 from an external reservoir (not shown in FIG. 1) of such electrolyte. This insures that the cell 10 is always filled with the requisite amount of electrolyte even in the presence of losses of electrolyte which may occur during operation of the cell 10. Losses of electrolyte in the region between the electrodes may occur during the operation of the cell 10 and, if not compensated for, can cause a reduction in the cell's output of electricity. Thereby, frequent shutdowns of the cell stack are not required to maintain the proper level of electrolyte in the outer layers 34 of the cells.

The central layer 32 is advantageously fabricated of a filamentary carbon paper manufactured by the Kureha Chemical Industry Company of Tokyo, Japan. The paper is composed of chopped carbon fiber produced from pitch and residual charred carbon of phenolic resin. The fine diameter filaments average 3 mm (millimeters) in length and bonded together to form a uniformly thin web. The paper is approximately 0.003 to 0.020 inches thick, preferably being approximately 0.009 to 0.011 inches thick, and is readily reduced in thickness under compression. The term "large pore" means pores approximately 50-300 microns in size while the term "small pore" means pores approximately 1-10 microns in size. During assembly of the cell 10, the layers thereof are compressed in sandwich-like form under a pressure of 30 to 50 lbs. per square inch.

The outer layers 34 are Teflon-bonded silicon carbide. The silicon carbide is mixed with a suspension of Teflon and an inking vehicle such as polyethylene oxide. The mixture is applied to the catalyst side of the electrode and then smoothed such as by a blade. The mixture is dried and sintered. The electrolyte is then added to the layers during assembly of the cell. The above described process produces a material having a small pore size in the ranges desired. Any suitable material can be used for layers 34. For instance, the material can be made from inert, solid, inorganic porous particles bonded with an inert coagulated fluoro-carbon polymer in the form of a network structure, and a free concentrated acid electrolyte entrapped in said network, wherein the inorganic particles are a compound which is a member of the group consisting of an oxide, sulfate and phosphate of at least one of the metals zirconium, tantalum, tungsten, chromium, and niobium as described in U.S. Pat. No. 3,453,149. This Patent is incorporated herein in its entirety by reference.

Further details on the construction of the respective layers of the cell 10 are well known, and are described, by way of example, in the foregoing U.S. Pat. Nos. 3,453,149, 4,064,322 and 4,175,165. These patents describe the construction of cells utilizing porous material with PTFE and coatings of precious metal catalysts. The multiple porosity characteristic of the matrix assembly 22 provides for both the hydrophilic properties of the outer layers 34 while utilizing the larger pores of the central layer 32 for holding, moving and distributing the electrolyte so as to maintain the electrolytic saturation of the outer layers 34 during operation of the cell 10. In addition, the presence of the electrolyte in all three layers of the matrix assembly 22 provide the requisite conduction path for the hydrogen ions. Thus, the matrix assembly 22 of the invention permits the cell 10 to operate normally while maintaining the uniform distribution and the proper level of electrolyte therein.

With reference to FIGS. 2-5, the system 52 comprises a set of cups 54 enclosed within a chamber 68 for storing electrolyte, the cups 54 being connected by a system 70 of passages to an inlet port 72. The individual cups 54 connect to the conduits 16, formed as capillary tubes, for conveying the electrolyte to the respective cells 10. Electrolyte entering through the inlet port 72 falls into the cups 54, and overflows from some of these cups 54 by the system 70 to enter other ones of the cups 54. The term "overflow" as used herein includes all types of systems wherein the excess electrolyte in the compartments flows out of the compartment after the compartment contains a predetermined amount of electrolyte. Specifically, it includes the system shown in FIGS. 2–5 and the packed bed system in FIG. 6. The electrolyte in each of the cups 54 is electrically isolated from the electrolyte of the other cups. The overflow feature avoids excessive or unintended hydrostatic pressure from being placed on the cells even while the cups or tanks are being refilled with electrolyte.

An alternative embodiment of the electrolyte distribution and storage systems as shown in FIG. 6 as system 52A. This system includes an elongated vertical chamber 90 formed with a series of internal compartments, or trays 92, having drain 94. Each tray 92 holds a wad 96 of sponge-like material which holds electrolyte, such as carbon fibers. The sponge material is desirable since it prevents spillage of the electrolyte.

This system is unique because it contains a three stage wicking system. Stage 1 is the packed bed or sponge 96. Stage 2 is the wicking fibers in the tube. Stage 3 is the electrolyte matrix assembly or layer in the cell. This three stage system provides additional control over the delivery of electrolyte in response to demand for electrolyte by the cell. This system also provides a constant hydrostatic pressure on the electrolyte in the cell due to the effect of the packed bed which provides a vertical height for the electrolyte. Electrolyte is circulated, via a well 98 and piping 100, by a pump 102 to pass through the chamber 90. The piping 100 enters the chamber 90 at an inlet port 104 at the top of the chamber 90 and exits through the drain 94 at the bottom of the chamber 90. The well 98 serves as a storage reservoir for electrolyte.

In operation, the electrolyte fills the wad 96 in the upper most tray 92, the excess electrolyte passing via the drain 94 into the was 96 in the following tray 92. Thereby, all the trays contain electrolyte at the same hydrostatic pressure, assuming that all wads 96 are of the same depth.

The drain is designed in a way that excess electrolyte would pass from one compartment to another via dripping, thus achieving an ionic separation between the individual components. This avoid possible shunt currents between compartments.

FIG. 6 also shows a stack 50 of cell 10, one cell being shown in detail, wherein the central layer 32 is coupled by a conduit 16, in the form of a tube 16 with an internal wick 78, to its corresponding tray 92. The difference in height between the top of a wad 96 and the central layer 32 of a cell 10 establishes the hydrostatic pressure. This hydrostatic pressure together with wick 76 in tube 16 and the drawing action of the central layer 32 draws electrolytes through the conduit 16. Connection of the end of a conduit 16 to an individual fuel cell, such as the cell 10, is made by layer 32 with the aid of a seal 84.

In operation, electrolyte is transported through the conduits 16 of the systems 52 and 52A by gravity and by capillary action, to enter fuel cells of a stack. By use of fuel cells constructed in accordance with the structure of FIG. 1, the central layer 32 of the matrix layer or assembly 22 draws electrolyte by capillary forces into the space between the electrodes 18 and 20. The hydrophilic layer 34 of the matrix 22 draws electrolyte from the central layer 32 and, thereby, creates space for more electrolyte which is provided by the movement of electrolyte down the conduits 16. It is recognized that the rate of delivery of the electrolyte into a fuel cell 10 may depend on the amount of hydrostatic pressure resulting from the difference in elevation between the top of the electrolyte in the cup 54 or the tray 92 and the cell 10. The cups 54 and trays 92 are arranged with increasing height corresponding to the increasing height of the successive cells in the stack. In addition, the cups 54 are filled to the brim, and similarly, the wads 96 are filled to the maximum amount so that the hydrostatic pressure developed within the individual cups 54 and wads 96 are maintained at the requisite amounts for maintaining the desired hydrostatic pressure. The individual cups or trays are open at their tops or mouths. Thereby, the fuel cells are filled with the requisite amounts of electrolyte without danger of overfilling.

The electrolyte cup 54 and trays 92 are shown in the Figures in the embodiment in which each supplies only one fuel cell with electrolyte. The electrolyte-containing compartments, trays or cups should be constructed so as to be electrically insulated from each other or made of a non-conducting material such as Teflon. This enables the individual cells to be connected in a series arrangement for development of substantial voltage and the cells to operate without danger of short or shunt current developing. They should also have good corrosion resistance against the electrolyte. In some environments, a small amount of shunt current is tolerable in a practical sense, and, thus, the connection of a suitably small number of cells to one compartment, cup or tray can be permitted.

It is to be understood that the abovedescribed embodiments of the invention are illustrative only and that modifications thereof may occur to those to be regarded as limited to the embodiment as disclosed herein, but is to be limited only as defined by the appended claims.

What is claimed is:

1. A system for supplying electrolyte to fuel cells in a stack of fuel cells comprising:
    (a) means for storing electrolyte externally to said fuel cells, an individual one of said cells including a means for holding and drawing electrolyte, said storing means including compartments for the separate storage of electrolyte,
    (b) means for conducting electrolyte from said compartments to the means for holding and drawing in respective ones of said cells; and
    (c) means for maintaining a predetermined hydrostatic pressure of electrolyte at said conducting means, said pressure maintaining means including means for positioning of said compartments at heights corresponding to the locations of respective ones of said cells in said stack and means for allowing the electrolyte to overflow from one compartment to the next.

2. A system according to claim 1 wherein said storing means stores electrolyte separately for each of said fuel cells of said stack, and wherein said system is configured to provide electrical isolation among the separately stored electrolytes for each of said cell.

3. A system according to claim 2 wherein said storing means is in the form of a cup having an open mouth, said cup being filled by applying electrolyte through said mouth until the cup overflows so as to maintain a predetermined depth and hydrostatic pressure within the storing means.

4. A system according to claim 1 wherein said conducting means comprises a set of capillary tubes.

5. A system according to claim 1 wherein each of said compartments includes a drain and a wad of sponge-like materials for absorbing electrolyte, the drain of one compartment conducting excess electrolyte to the wad of the next compartment via a dripping process.

6. A system according to claim 5 wherein said wads are fabricated of carbon fibers.

7. A system according to claims 1 or 6 further comprising a circulatory system for re-circulating electrolyte through said compartments.

8. A system according to claims 3 or 5 wherein said conducting means comprises a set of tubes containing wicking material.

9. A system for supplying electrolyte to a fuel cell having a means for drawing and holding electrolyte comprising:
   (a) means for storing electrolyte externally to said fuel cell, said storage means having a wad of sponge-like material therein for absorbing electrolyte; and
   (b) means for conducting electrolyte from said storing means to the means for holding and drawing electrolyte to said cell.

10. The system of claim 9 wherein said wad is filled with electrolyte to its maximum amount.

11. The system of claim 9 further including a circulating system for recirculating electrolyte through said storage means and maintaining said wad filled with electrolyte to its maximum amount.

12. A system for supplying electrolyte to fuel cells in a stack of fuel cells comprising:
   (a) means for storing electrolyte externally to said fuel cells, an individual one of said cells including a means for holding and drawing electrolyte, said storage means including compartment means for the separate storage of electrolyte;
   (b) means for conducting electrolyte from said compartment means to the means for holding and drawing in respective ones of said cells; and
   (c) said storing means for including a chamber and said compartment means comprising tray means within said chamber supporting a packed material which absorbs electrolyte, said tray means positioned at heights corresponding to the locations of respective ones of said cells in said stack.

13. The system of claim 12 wherein the chamber has an electrolyte inlet means at the top thereof and an electrolyte outlet means at the bottom thereof and wherein the tray means have an electrolyte outlet means at the bottom thereof.

14. The system of claim 13 further including a circulatory system for recirculating electrolyte through the chamber by introducing it at the chamber inlet means and collecting it at the chamber outlet means.

* * * * *

UNITED STATES PATENT AND TRADEMARK OFFICE
CERTIFICATE OF CORRECTION

PATENT NO. : 4,463,067
DATED : July 31, 1984
INVENTOR(S) : H. Feigenbaum

It is certified that error appears in the above—identified patent and that said Letters Patent is hereby corrected as shown below:

In Column 1, line 8, after "DEN3-241" please add --awarded by the U.S. Department of Energy.--

Signed and Sealed this

Twenty-second Day of November, 1988

Attest:

DONALD J. QUIGG

Attesting Officer     Commissioner of Patents and Trademarks